United States Patent [19]

Mills

[11] 4,098,536
[45] Jul. 4, 1978

[54] WEATHERSHIELD FOR GOLF CARTS

[76] Inventor: Marion T. Mills, P.O. Box 460, Morehead City, N.C. 28557

[21] Appl. No.: 744,732

[22] Filed: Nov. 24, 1976

[51] Int. Cl.² .............................................. B60J 9/00
[52] U.S. Cl. ................................ 296/78 R; 135/1 A; 280/DIG. 5
[58] Field of Search .............. 296/78 R, 78 A, 95 R, 296/136; 135/1 A, 5 A; 280/DIG. 5

[56] References Cited

U.S. PATENT DOCUMENTS

| 2,608,198 | 8/1952 | Goodman | 135/1 A |
| 2,639,751 | 5/1953 | Flaherty | 296/136 |
| 3,709,553 | 1/1973 | Churchill | 280/DIG. 5 |
| 3,834,756 | 9/1974 | Grell | 296/78 A |

Primary Examiner—Joseph F. Peters, Jr
Assistant Examiner—John A. Carroll

[57] ABSTRACT

A flexible sheet of at least partially transparent, water repellent material is constructed to fit over the roof or canopy and sides of a golf cart for enclosure during inclement weather. An access is provided through the side wall for getting in and out of the cart and, when not in use, the weathershield may be removed from the cart, folded and stored in a pouch.

8 Claims, 7 Drawing Figures

U.S. Patent  July 4, 1978  Sheet 1 of 3  4,098,536 ns of which:

WEATHERSHIELD FOR GOLF CARTS

BACKGROUND OF THE INVENTION

Due to the increasing popularity of golf as a year around sport, much has been done to improve equipment which is specifically, or to a significant degree, designed for use to protect players against inclement weather conditions. This application is directed to an article for the protection of golf cart riders during adverse conditions such as wind and rain.

There are existing devices of this type in the prior art. Looking at early developments, one will find various types of roofs and canopies on carts for protecting occupants primarily from the sun. A later U.S. Pat. No. 3,709,553 to Churchhill et al is somewhat related to applicant's invention as it discloses a rain curtain that is slidable along a channel around the sides of a golf cart roof of the type which has a special rear compartment for golf clubs. The Churchhill patent further includes a separate curtain to cover the specially formed club compartment and, according to Churchhill's teachings, the curtains are a substantially permanent attachment to the golf cart. When not in use they are compressed or drawn to one rear side.

The types of devices as described in the prior art are adequate in many respects but in other ways exhibit various disadvantages which lead to the result that few, if any, golfing establishments have provided these curtains and rain guards on their golf carts. Obviously the rain guards are an additional expense which many clubs do not wish to incur and in many instances their existing carts may not be suitable for application of the curtains. Therefore, when a golfer is playing on a course which does not provide golf carts equipped for inclement weather, that person is subject to being uncomfortable or to interrupting the game. While a golfer's home course may possibly provide weather-proof carts, it is quite likely that in today's mobile society that same golfer will travel on vacation or for business reasons and play on many courses that do not have such carts.

SUMMARY OF THE INVENTION

The present invention, on the other hand, provides a completely removable, collapsible, weathershield which may be easily and quickly emplaced on any existing golf cart having a canopy or roof. The configuration of the shield is such that it encloses both the passenger and club compartments. When not in use it may be easily folded and stored.

It is therefore a primary object of the present invention to provide a golf cart weathershield which is easily removable and may be used on a variety of existing carts without substantial modification to the cart.

A further object of the present invention is to provide a weathershield for golf carts; which shield, when not in use, may be compactly folded and packed into a pouch for storage.

Another object of the present invention is the provision of a weathershield which will completely enclose both the occupant and club compartments of a golf cart while providing substantially weather tight access into and out of the cart.

Still further objects and advantages of this invention will become clear as the following detailed description is studied in conjunction with the accompanying drawings, of which:

DETAILED DESCRIPTION OF THE PREFERRED EMBODIMENT

Figure 1:
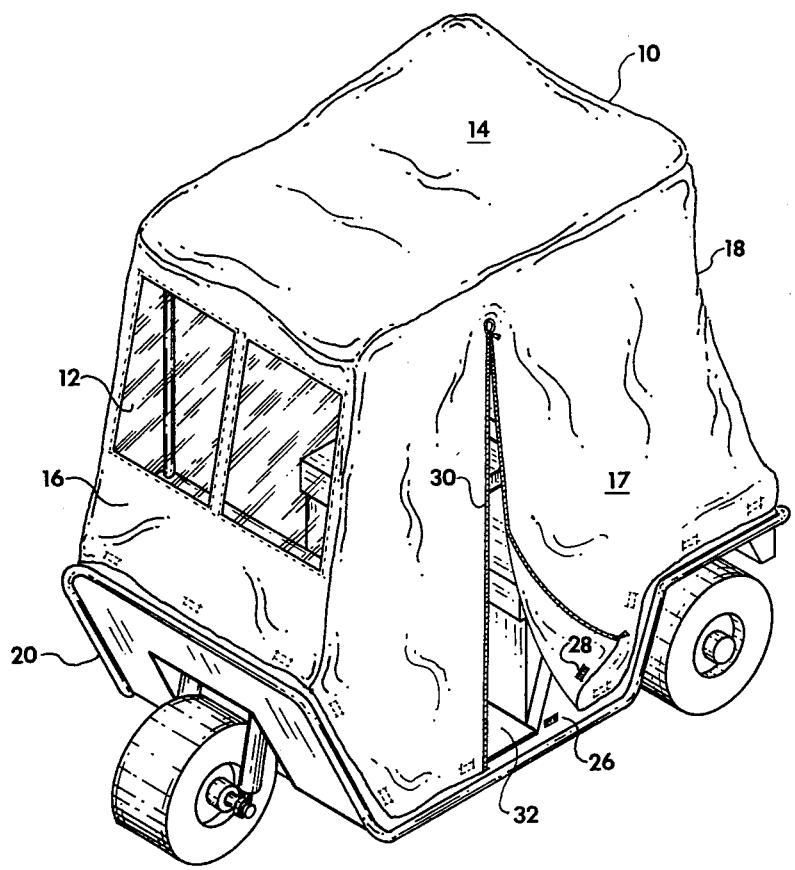
FIG. 1 is a perspective view of a golf cart with the weathershield of the present invention in place over the cart.

Turning now to a discussion of FIG. 1 the weathershield 10 according to the present invention is illustrated as it would be used over the golf cart 20. The golf cart 20 is a conventional model including a passenger compartment 22, a club compartment 23, and a fixed-position sun roof or canopy 24. As illustrated, the weathershield 10 is placed down over the golf cart supported by canopy 24, and its lower edges maintained in a position close to the cart so that it won't be disturbed or blown off by windy conditions.

Generally the shield 10 is constructed from a flat sheet of material such as plastic, or more expensive embodiments may be constructed from canvas or tarpaulin, all of which materials are essentially weather and water repellent. A top wall 14 includes front wall 16, side walls 17, and a rear wall 18 depending from the side edges of the top wall. Preferably the side edges of front wall 16 adjoin the front edges of the side walls 17, and the side edges of the rear wall adjoin the rear edges of side walls 17 although the aforementioned edges could be separate and attach to the canopy frame.

Figure 2:
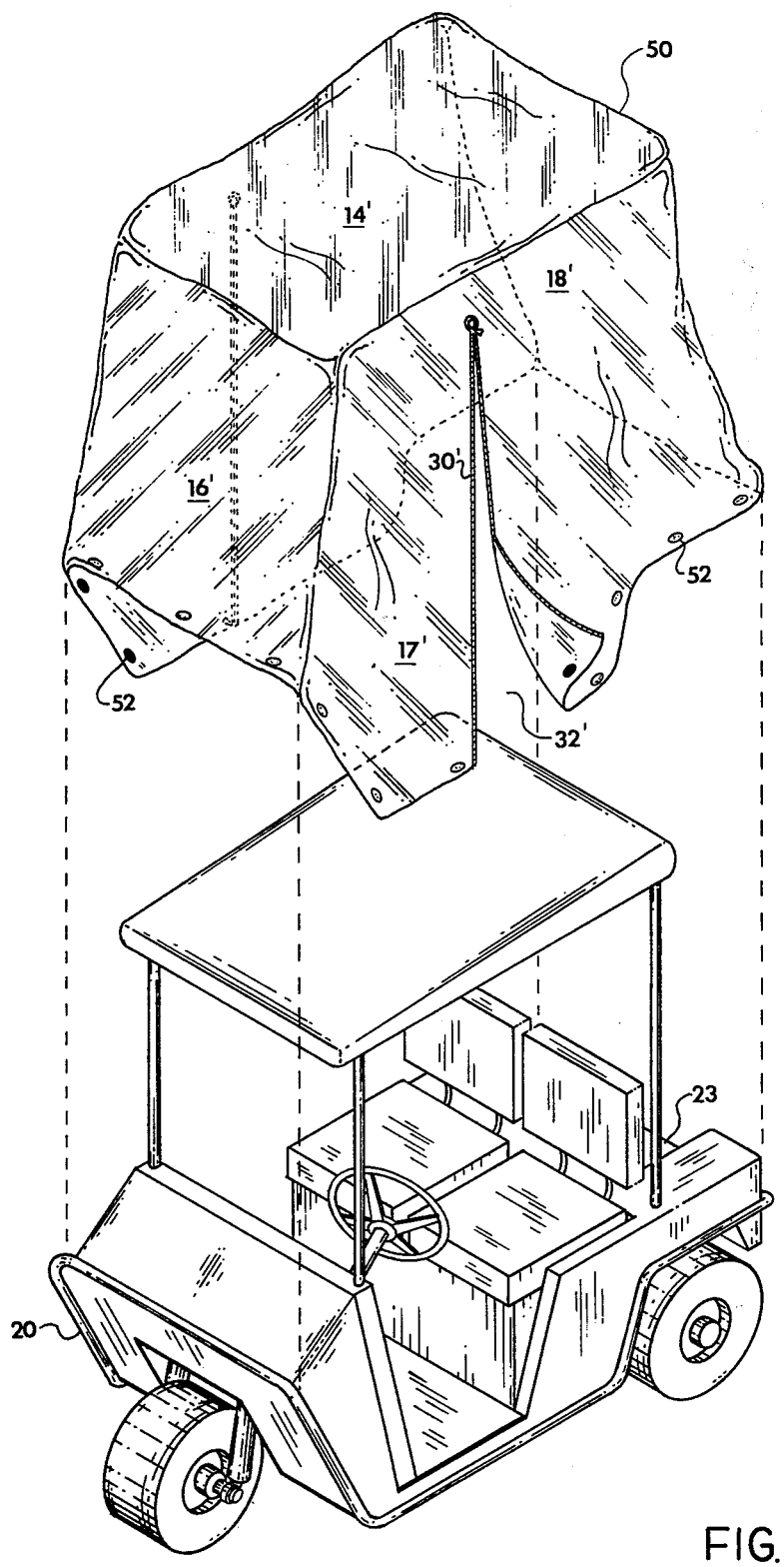
FIG. 2 is a perspective view illustrating the weathershield as it is being placed into position over a conventional canopied golf cart.

As shown in FIG. 1 the material used in one embodiment is opaque canvas and the shield therefore includes a transparent portion 12 in the front wall 16 for visibility. The transparent portion 12 is generally constructed of a material such as polyethylene or any of the flexible, tough plastics. However, as seen in FIG. 2, the entire shield 50 may be constructed of a transparent plastic material for all around visibility. No preference as to the use of opaque or transparent material, other than expense and durability, is specified other than insuring that if an opaque material is used, the transparent portion 12 must be large enough to provide adequate visibility for safe maneuvering of the cart. A driver must be able to see clearly to the sides and front of the cart, although due to the type of traffic on a golf course, rear windows are not considered necessary in the weathershield. An additional advantage to using transparent material for the entire shield as at 50 in FIG. 2 is the fact that it is substantially less expensive than canvas or tarp.

Figure 4:
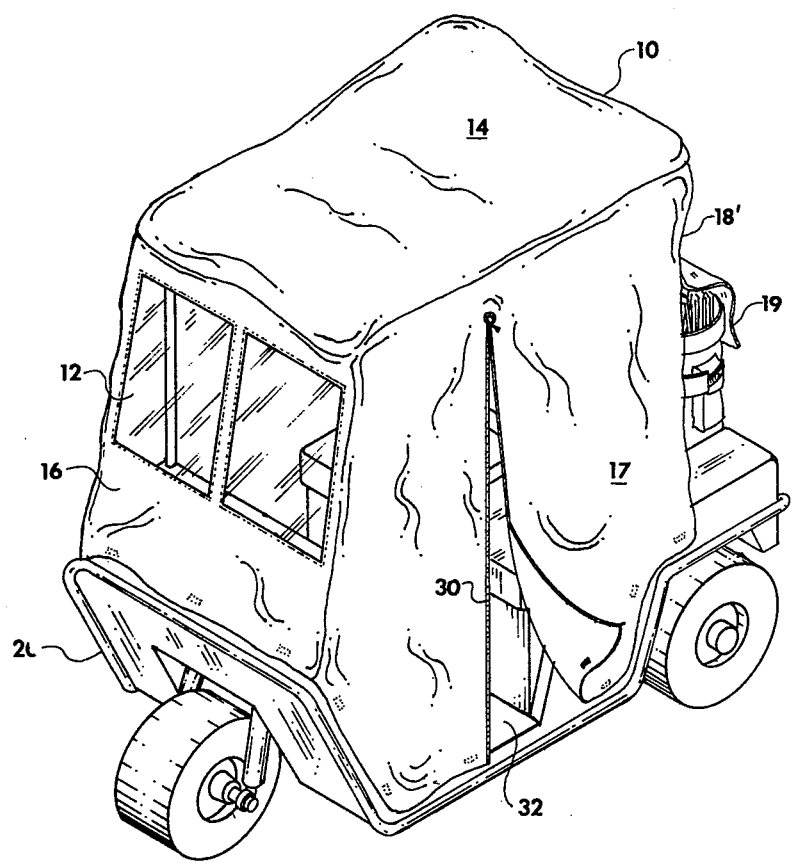
FIG. 4 is a perspective view similar to FIG. 1, except showing an alternate embodiment of the rear wall.

To place the weathershield over the golf cart, the shield is unfolded, and as shown in FIG. 2, slipped down over the cart with the top panel 14 supported by the cart roof and the window 12 (where applicable) at the front of the cart. The top panel 14 of the weathershield is generally rectangular in shape and approximately the same size as a conventional rectangular sun roof 24. The configuration of top panel 14 aids in obtaining a snug fit over the cart roof and thereby provides better support for the front 16, rear 18, and side 17 walls of the weathershield. The walls of the weathershield should be of a length at least sufficient to adequately enclose the passenger compartment. Further the rear wall should be of such size as to cover the club compartment 23, or alternatively, the rear wall 18 can hang straight and an auxiliary flap 19 (FIG. 4) can be attached to the rear wall to hang down over the club compartment. After the shield is in place over the cart the front, rear and side walls are maintained close to the cart by suitable means such as strips of a textile fastening material known as Velcro 28 (FIG. 1), magnetic weights 52 (FIG. 2), or the like, positioned along the lower edge of the weathershield 10. Where Velcro strips 28 are used, they are mated to Velcro strips 26 which are secured at corresponding intervals around the outside body of the cart. Velcro is a trademark of a commercially available, textile fastening material, one strip of which has minute loops or hooks on the surface thereof, which cooperates with a mating strip having the other of either minute loops or hooks on the surface thereof. Other means of maintaining the shield to the cart, including clamps, hooks, snaps, etc., could be employed so long as the attachment means is adequate to prevent wind and water from blowing under the shield or the shield being torn off by heavy winds.

Access into and out of the cart is afforded by the placement of a large, heavy duty zipper 30 in a placket 32 in at least one, but preferably both, side walls 17. The placket or opening 32 is not limited in size but should be adequate to permit an adult male to easily enter the passenger compartment of the golf cart. Although other closures could be utilized in the opening, such as mating Velcro strips along the edges of the placket 32, the zipper 30 is preferred because of its tight closure and relative ease of operation and installation. Further, a slit, with or without a flap, (not shown) may be employed in the rear wall for access to the clubs.

Figure 3:
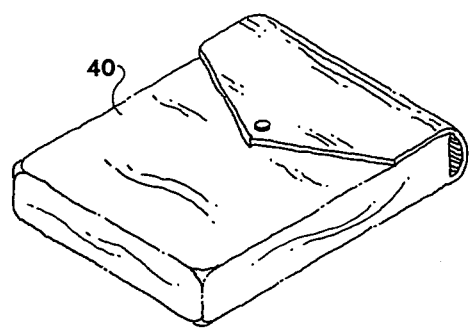
FIG. 3 is a perspective view of the weather shield in its folded, pouch-contained state.

When the shield 10 is not in use, it is removed from the cart, permitted to dry, and folded for storage in a pouch 40 as illustrated in FIG. 3. Because of the flexibility of the material and its overall configuration the shield may be easily and compactly folded for storage. Therefore, a golfing establishment can keep the weathershield on hand for use as desired with much less expense than would be necessary to equip existing carts with permanent shields. The pouch 40, used for storing the weathershield, is compact and easily stored on shelves with little space required. Additionally individuals may desire to purchase and carry the shields with them to various courses for utilization during poor weather. If the weather appears unpredictable, the shield may be placed over the cart and the side walls folded up and rested on the top of the cart until needed.

Although a preferred embodiment has been herein described it should be understood that further modification may become apparent to those skilled in the art and be made without departing from the scope of the invention which is limited only by the following claims.

What is claimed is:

1. A removable weathershield for use on golf carts of the type having a roof, open sides, and a passenger compartment, used to transport passengers and their equipment around a golf course, said weathershield comprising a sheet of flexible, water repellent material in a configuration including:
   (a) a top wall having outer dimensions at least equal to the outer dimensions of the roof of the golf cart;
   (b) front, side and rear walls all depending downwardly from the outer edges of said top wall portion and being of a length sufficient to enclose the open sides of the golf cart, said rear wall including means associated therewith for covering the club compartment of said golf cart;
   (c) a transparent portion in at least the front wall for visibility in guiding the cart;
   (d) access means in at least one of said side walls for moving in and out of the cart;
   (e) means along the lower edges of said front, side and rear walls for maintaining said weathershield substantially adjacent the body of the golf cart;
whereby said weathershield may be placed down over the open sides of said golf cart during inclement weather to completely enclose said cart and removed for storage during fair weather.

2. A weathershield as described in claim 1 wherein said access means for moving into and out of the cart includes a placket in at least one side wall, said placket being of a length sufficient to permit access therethrough by an adult human of average size and including a closure device for selectively closing and opening said placket.

3. A weathershield as described in claim 2 wherein said closure device is a zipper.

4. A weathershield as described in claim 1 wherein said means for maintaining said weathershield substantially adjacent the body of the cart includes magnetic weights attached at selected intervals along the lower edges of said front, side and rear walls of said weathershield.

5. A weathershield as described in claim 1 wherein said means for maintaining said weathershield substantially adjacent the body of the cart includes first strips of textile material having a multiplicity of minute hooks on the surface thereof and second strips having a multiplicity of loops on the surface thereof, one set of said first and second strips being attached at selected intervals along the inside lower edges of said front, side and rear walls of said weathershield in selective mating relationship with a set of the other of said first and second strips of textile material attached at intervals along the exterior body of the golf cart, whereby when said first and second strips are pressed together they are maintained in a releasably secured state.

6. A weathershield for use on golf carts of the type having a roof, open sides and a passenger compartment, used to transport passengers and their equipment around a golf course, said weathershield comprising a sheet of transparent, flexible and water repellent material in a configuration including:
   (a) a top wall portion having outer dimensions at least equal to the outer dimensions of the roof of the golf cart;
   (b) front, side and rear walls all depending downwardly from the outer edges of said top wall portion and being of a length sufficient to enclose the open sides of the golf cart, said rear wall including means associated therewith for covering the club compartment of said golf cart;
   (c) access means in at least one of said side walls for moving in and out of the cart;
   (d) means along the lower edges of said front, side and rear walls for releasably securing said weathershield to the body of the golf cart;
whereby said weathershield may be placed down over the open sides of said golf cart during inclement weather to completely enclose said cart and removed for storage during fair weather.

7. The weathershield for golf carts according to claim 6 wherein said rear wall extends out over the club compartment to form said means for covering the club compartment.

8. The weathershield for golf carts according to claim 6 wherein said rear wall includes an auxiliary flap extending out over said club compartment to form said means for covering the club compartment.

* * * * *